United States Patent [19]

Mitsui et al.

[11] 4,033,805

[45] July 5, 1977

[54] METHOD FOR MANUFACTURING AN INSULATED ELECTRIC COIL

[75] Inventors: Hisayasu Mitsui; Jun-ichi Kamiuchi; Ryozi Kumazawa; Kimikazu Umemoto; Toshimitsu Yamada; Katsuhiko Yoshida; Taichi Takechi, all of Yokohama, Japan

[73] Assignee: Tokyo Shibaura Electric Co., Ltd., Kawasaki, Japan

[22] Filed: Feb. 24, 1976

[21] Appl. No.: 660,776

Related U.S. Application Data

[63] Continuation of Ser. No. 443,472, Feb. 19, 1974, abandoned.

[30] Foreign Application Priority Data

May 30, 1973 Japan .............................. 48-60705

[52] U.S. Cl. .................................. 156/185; 156/53; 156/283; 156/330; 174/110 E; 427/203; 427/204; 428/324; 428/454
[51] Int. Cl.² .................. B32B 19/04; B32B 31/12; H01B 13/08
[58] Field of Search .......... 156/283, 330, 307, 309, 156/52, 53, 185; 174/110 E, 110 R, DIG. 3; 428/324, 454; 427/203, 204

[56] References Cited

UNITED STATES PATENTS

| | | | |
|---|---|---|---|
| 2,917,570 | 12/1959 | Wolff et al. | 428/324 |
| 3,254,150 | 5/1966 | Rogers | 428/324 |
| 3,470,045 | 9/1969 | Bronnvall et al. | 428/324 |
| 3,592,711 | 7/1971 | Senarelens et al. | 156/330 |
| 3,618,753 | 11/1974 | Glasspoole | 428/324 |
| 3,740,289 | 6/1973 | von Alten et al. | 156/330 |
| 3,811,005 | 5/1974 | Trunzo et al. | 428/324 |

FOREIGN PATENTS OR APPLICATIONS 677,846  1/1964  Canada ............................. 156/283

Primary Examiner—George F. Lesmes
Assistant Examiner—R. J. Roche
Attorney, Agent, or Firm—Finnegan, Henderson, Farabow & Garrett

[57] ABSTRACT

A compound mica sheet is prepared by bonding a mica sheet to a woven fabric through a powdered epoxy resin with curing agent. The mica sheet holds a cured thermosetting resin composition impregnated therein and has an uncured epoxy resin composition including a curing agent impregnated therein. When thermosetting resin is forcedly impregnated, through vacuum/pressure impregnation, into a coil wound with the compound mica sheet which is adapted for use in medium and high voltage electric apparatus, and then cured, an excellent insulated coil is obtained.

20 Claims, 5 Drawing Figures

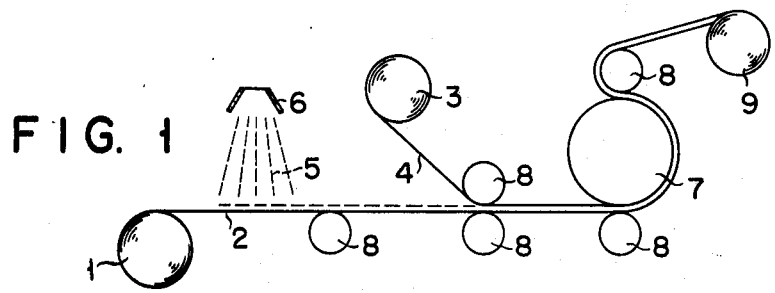
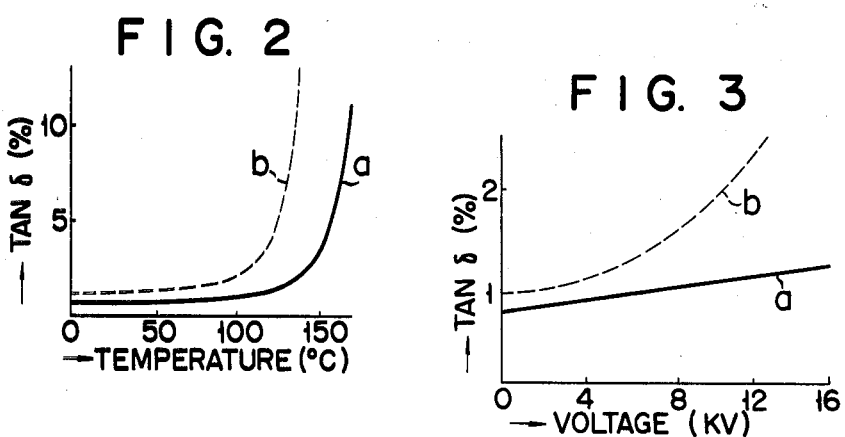
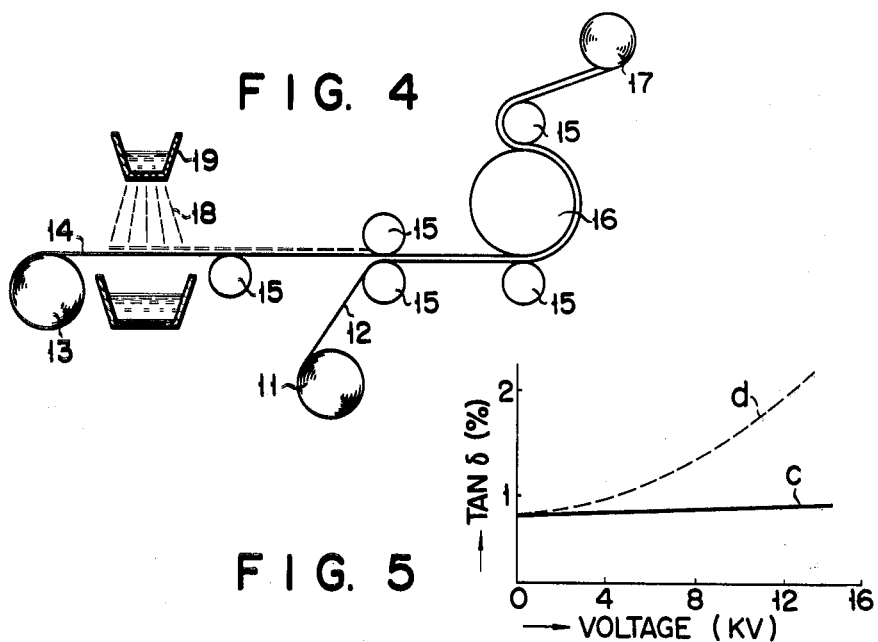

METHOD FOR MANUFACTURING AN INSULATED ELECTRIC COIL

This is a continuation of application Ser. No. 443,472, filed Feb. 19, 1974, now abandoned.

This invention relates to a compound mica sheet suitable for insulating a coil for medium and high voltage electrical apparatus and a method for manufacturing the same.

A recent trend is towards electrical apparatus with a larger capacity, and a high insulating property and high mechanical strength are required as an insulating material for use in insulating a coil for medium and high voltage electrical apparatus. Methods for insulating the coil are divided into two broad classes.

As one method, thermosetting resin such as epoxy, silicone, phenol, polyester etc. is preliminarily condensed in a solvent to form a liquid adhesive. The liquid adhesive is impregnated into a compound layer consisting of a mica sheet or mica film and a lining material such as a glass woven fabric paper, plastics film etc. and dried into a prepreg. The prepreg is wound on a coil.

As another method, a mica sheet is bonded to a lining material using a lesser amount of adhesive, for example, 5 to 30% by weight of a liquid adhesive based on the weight of the mica to form a semidry type compound mica sheet. Then, the compound mica sheet is wound on a coil to form an insulated coil. The insulated coil is introduced into a tank and dried under reduced pressure to cause solvent, water etc. to be evaporated.

Thereafter a nonsolvent type thermosetting resin is impregnated into voids created between the layers of the insulated coil. During this operation a reduced pressure is maintained within the tank, and then a pressure is applied to the resin to cause is forcedly to be impregnated between the layers of the insulated coil. This method is called a vacuum/pressure impregnation. Then, the so impregnated coil is subjected to simultaneous heat and pressure to form a predetermined, cured shape.

In the former method, the solvent is not completely purged from within the coil and voids are left in the coil, resulting in the degradation of voltage-tan δ characteristics and temperature-tan δ characteristics. Therefore, there is the tendency for voltage endurance to be decreased due to a corona deterioration for a long period of usage.

The latter method is relatively free from the above-mentioned drawbacks and is widely adopted for insulation of electrical apparatus designed for use at high voltage, high temperature and humidity. However, the latter method has the following disadvantages. When a liquid adhesive is used for bonding a mica sheet to a lining material, it penetrates into the mica structure. So, an adhesion efficiency between the mica sheet and the lining material is lowered.

Generally, a non-solvent type thermosetting resin for vacuum pressure impregnation is selected from those having lower viscosity and long service life. Such an impregnation resin is relatively long in curing reaction time.

As the non-solvent type thermosetting resin having such properties, use may be made of, for example, an epoxy resin composition consisting of 100 parts by weight of bisphenol A diglycidyl ether commercially available under the trade name of Epikote 828 and 826-Shell Chemical Corp.-and 70 and 90 parts by weight of methylnadic anhydride (MNA) or methyltetrahydrophthalic anhydride (MTHPA); or an epoxy resin composition consisting of 100 parts by weight of 3, 4-epoxycyclohexylmethyl (3, 4-epoxy)-cyclohexanecarboxylate commercially available under the trade name of Chisonox 221-Chiso KK- and 80 to 120 parts by weight of hexahydrophthalic anhydride or 3 or 4 methyltetrahydrophthalic anhydride.

However, these resin compositions are not easily reacted without any accelerator. There has been proposed a method for preliminarily introducing into a mica layer an adhesive including an accelerator, impregnating with said resin composition an insulated coil wound with a compound mica sheet, and causing said resin composition to be reacted with the accelerator by subjection to heating at a forming process.

In this case, said resin composition is impregnated in and between the compound mica sheet layers wound on the coil and no accelerator is present at the impregnated resin layer between the compound mica sheet layers. Therefore, only the resin composition impregnated into the mica layer incliuding an accelerator is first cured at the forming process and the curing of the resin composition layer created between the compound mica sheet layers is somewhat delayed.

The uncured resin composition having no accelerator is liable to be flowed out by a pressure applied at a forming process. As a result, formation of a resin layer on the surface of an insulated coil is insufficient and the gloss of coil surface is somewhat lost or voids are created at the time of shrinkage due to curing. Besides, a low-viscosity resin composition infiltrated into the mica layer through vacuum/pressure impregnation is mixed with a liquid adhesive used in bonding the mica sheet to the lining material, to cause the mica layer so be swelled with the result that the mica is flowed out by a pressure applied to the mica layer at the forming process and the content of the mica is lowered to cause its voltage endurance characteristic to be deteriorated.

An object of this invention is to provide a compound mica sheet having a high insulating characteristic as well as a high mechanical strength.

Another object of this invention is to provide a compound mica sheet in which a mica layer is bonded to a lining material by a powdered adhesive not infiltrated into the mica layer.

Another object of this invention is to provide a compound mica sheet suitable for being forcedly impregnated with thermosetting resin by a vacuum/pressure impregnation method.

Another object of this invention is to provide a method for manufacturing the above-mentioned compound mica sheet.

In one aspect of this invention there is provided a compound mica sheet prepared by bonding a mica sheet to a lining material through a powdered epoxy resin with curing agent.

In another aspect of this invention there is provided a compound mica sheet prepared by bonding a mica sheet to a lining material through a powdered epoxy resin with curing agent. The mica sheet holds a cured thermosetting resin composition impregnated therein.

In a further aspect of this invention there is provided a compound mica sheet prepared by bonding a mica sheet to a lining material through a powdered epoxy resin with curing agent. The mica sheet holds a cured thermosetting resin composition impregnated therein and has an uncured epoxy resin composition impregnated therein.

This invention can be more if fully understood from the following detailed description when taken in conjunction with the accompanying drawings, in which:

FIG. 1 shows a manufacturing process according to one embodiment of this invention;

FIG. 2 is a graphical representation showing a comparison between a temperature-tan s characteristic of a compound mica sheet according to one embodiment of this invention and that of the prior art compound mica sheet;

FIG. 3 is a graphical representation showing a comparison between a voltage-tan δ characteristic of a compound mica sheet according to one embodiment of this invention and that of a prior art compound mica sheet;

FIG. 4 shows a manufacturing process according to another embodiment of this invention; and FIG. 5 is a graphical representation showing a comparison between a voltage-tan δ characteristic of a compound mica sheet according to another embodiment of this invention and that of a prior art compound mica sheet.

According to this invention use is made, as an adhesive for use in bonding a mica sheet to a lining material, of a powdered epoxy resin with curing agent, and as the curing agent use is made of acid anhydride series or amine series. As the powdered epoxy resin with curing agent there are preferably used, for example, Epiform EPX-1346, EPX-7150 and EPX-7154 (trade names Somar Kogyo Co., Ltd.). The finer the particle size of the mixed powders, the firmer the resultant bonding effect. For example, about 50 to 500 mesh of mixed powders are desirably used.

Since a mica sheet as used in this invention has a high tensile strength, a sheet consisting of a mica paper is most suitable. The mica paper is manufactured in a well known manner by arranging and drying small mica particles in the form of a paper using a paper machine. The mica paper is alternatively called as a reconstituted mica. A flake mica can be used by adding the powdered adhesive of this invention between respective flakes. As the lining material, a paper, woven fabrics and plastics film are included. Among the woven fabrics, particularly a glass woven fabric is desirably used.

According to one mode of this invention a compound mica sheet is provided by bonding a mica sheet to a lining material through a powdered epoxy resin with curing agent. Where the mica paper is used as one component of a compound mica sheet, the amount of the powder is preferably 0.5 to 8% by weight based on the weight of the mica, though the amount is varied dependent upon the kind of lining materials and the thickness of the mica sheet. Where a flake mica is used, the amount of the mixture suitably occupies 0.5 to 6% by weight based on the weight of the mica.

A liquid adhesive of non-solvent type or solvent type as used in bonding a mica sheet to a lining material permeates a mica structure and, therefore, the use of a small amount of liquid adhesive results in an insufficient bonding of the mica sheet to the lining material. The liquid adhesive as used in the conventional compound mica sheet has the tendency for preventing impregnation of a non-solvent type thermosetting resin composition through vacuum/pressure impregnation method. In contrast, the powdered adhesive according to this invention shows little permeation or infiltration into the mica layer. The powdered adhesive is fused upon heating to show a sufficient bonding effect in a small amount and has no tendency for preventing permeation of the resin composition into a compound mica sheet under vacuum/pressure method.

FIG. 1 shows a method for bonding a mica sheet to a lining material using the above-mentioned adhesive. A reference numeral 1 is a mica sheet feeding drum upon which a mica sheet 2 is wound. 3 is a lining material feeding drum around which a glass woven fabric 4 is wound. 5 shows Epiform EPX-1346 of powdered adhesive which is sprayed over the surface of a travelling mica sheet through a spray 6. 7 is a heating drum whose surface is coated with a fluoroplastic and 8 is a guide roll. 9 is a take-up roll for taking up a finished compound mica sheet. A glass woven fabric 4 is fed over the mica sheet on which 3% by weight of powdered adhesive 5 based on the weight of the mica is sprayed through the spray 6.

The resultant compound sheet is subjected to simultaneous heating and pressure at the heating drum 7 kept at a temperature of 100° to 150° C. As a result, the powdered resin is thermally fused to case the mica sheet to be bonded to the glass woven fabric, thereby manufacturing a compound mica sheet. The compound mica sheet has a sufficient strength and can be mechanically wound on a coil. FIGS. 2 and 3 show a temperature-tan δ characteristic and a voltage-tan δ characteristic, respectively, of (a) a compound mica sheet (this invention) which is wound on a coil and then impregnated with thermosetting resin at vacuum under pressure, followed by curing, and (b) a prior art compound mica sheet prepared using a solvent-type liquid adhesive which is wound on a coil and then subjected to the same treatment as mentioned above. As is evident from the Figures, (a) is smaller in the value of tan δ than (b) and exhibits an excellent performance over (b).

According to another mode of this invention there is provided a compound mica sheet obtained by impregnating a mica sheet with a thermosetting resin composition, before or after the mica sheet is bonded to a woven fabric through a powdered adhesive consisting of epoxy resin and curing agent, and curing the resin composition; or a compound mica sheet obtained by impregnating a mica sheet with an uncured epoxy resin composition containing a curing agent after said thermosetting resin composition is cured. As a thermosetting resin composition to be impregnated into the mica sheet, for example, use is made of a composition consisting of 100 parts by weight of bisphenol A diglycidyl ether epoxy resin commercially available under the trade name of Epikote 828-Shell Chemical Company— and 13 parts by weight of triethylenetetraamine and solvent. The composition is impregnated into a mica sheet and through evaporation of the solvent the resin is cured. This process causes a coarse chain of the cured resin to be created within the mica layer. The chain structure serves to prevent a flow out of a mica by a pressure applied to a compound mica sheet at the forming process to be followed. Where a mica sheet is a mica paper, the amount of impregnation of the thermosetting plastics composition is desirably 0.1 to 1% by weight based on the weight of the mica. When it is below 0.1% by weight, the formation of the chain will be insufficient. When it is above 1.0% by weight, the resultant mica layer is made too hard and difficulty is presented in winding on a coil a compound mica sheet having the mica layer. As the thermosetting resin composition any of a room temperature curing type, medium temperature curing type and a high temperature curing type may be used. Particularly preferable is the room temperature curing type.

The resin constituting the thermosetting resin composition is not restricted to epoxy resin and the other thermosetting resin such as polyester, polyimide, EC 6917 (trade name— Toshiba Silicone Company) of a silane-coupling agent can be used. An uncured epoxy resin composition to be impregnated into the mica sheet having a chained, cured mica layer consists of epoxy resin and a small amount of a curing agent. As epoxy resin, bisphenol A diglycidyl ether epoxy resin such as Epikote 828 and 1001 (trade names-Shell Chemical Company) and phenol-formaldehyde novolak polyglycidyl ether epoxy resin such as DEN 431 and 438 (trade names-Dow Chemical Company) can be listed. The curing agent to be used with epoxy resin is required to meet the requirements that it has a long shelf life and that it has the ability for facilitating the curing rate of resin after impregnation resin is impregnated into the mica layer at vacuum under pressure. As a curing agent for meeting such requirements there is listed a boron trifluoride ($BF_3$) amine complex such as $BF_3$-piperidine complex, $BF_3$-benzylamine complex, $BF_3$-monoethylamine complex $BF_3 \cdot NH_2C_2H_5$). As a preferable combination of epoxy resin and curing agent, 0.1 to 0.3 parts by weight of $BF_3$-monoethylamine complex or 0.3 to 1.0 part by weight of $BF_3$-piperidine complex is added to 100 parts by weight of epoxy resin consisting of 20 to 40 parts by weight of Epikote 1001 or DEN 438 and 80 to 60 parts by weight of Epikote 828.

Where a mica sheet consists of a mica paper, the amount of an epoxy resin composition to be impregnated into the mica sheet is suitably 5 to 20% by weight based on the amount of the mica. When the amount of impregnation of the epoxy resin composition is below 5% by weight, a mica layer loses its flexibility and when it is above 20% by weight, the infiltration of the resin into the mica sheet by subjection to impregnation at vacuum under pressure is prevented and the mica sheet shows the tendency of being sticky. The amount of $BF_3$-amine complex of the curing agent occupied in the epoxy resin composition is stoichiometrically small. However, if this amount is larger, a reaction with the resin impregnated under vacuum/pressure impregnation method is quickened to an extreme extend and the impregnated resin is gelled before it is press formed. As a result, the insulated coil prepared with the compound mica sheet and impregnated resin is lowered in its dimensional accuracy with the poor characteristics.

As mentioned above, the mica sheet is impregnated with thermosetting resin composition and, after cured, impregnated with an uncured epoxy resin composition containing a curing agent. The resultant mica sheet is bonded to a woven fabric through a powdered adhesive. This bonding method is shown in FIG. 4 by way of example. In the FIG., 11 is a mica sheet supply drum around which is wound a mica sheet 12 to which the chained, cured resin and uncured epoxy resin are imparted. 13 is a lining material supply drum around which a glass cloth 14 as a lining material is wound. 15 is a guide roll and 16 is a heating drum kept at a temperature of 100° to 150° C. 17 is a take-up roll and 18 is a powered adhesive consisting of a curing agent and epoxy resin and having a particle size of 50 to 500 meshes. 19 is a spray for spraying the powdered adhesive on the surface of a travelling glass cloth 14.

Since the particle size of the powdered adhesive 18 is very fine, the powder is pressed through the mesh of the glass cloth and electrostatically deposited onto the rear side of the glass cloth. The powder-deposited glass cloth is brought into contact with a mica sheet 12 to form a compound layer. The compound layer is thermally pressed at a heating drum 16 to produce a compound mica sheet. The compound mica sheet is wound around the take-up roll 17. The so manufactured compound mica sheet is cut to a predetermined width to form a tape. This tape was wound on a coil. The resultant coil was vacuum-pressure impregnated with a non-solvent type thermosetting resin composition and then thermally pressed into a predetermined cured form. Since the resin composition impregnated between the layers of the compound mica sheet by subjection to vacuum/pressure impregnation is cured without delay by reaction with the powdered curing agent included in the powdered adhesive, a flow of the resin is positively prevented. The pressure of the chained, cured resin impregnated into the mica layer prevents also a flow of the mica during the forming operation. $BF_3$-amine complex of the curing agent constituting one component of the uncured epoxy resin composition which is imparted to the mica layer facilitates during the forming operation the curing rate of the resin impregnated by subjecting to vacuum/pressure impregnation.

FIG. 5 shows a voltage-tan $\delta$ characteristic of (c) an insulated coil pressure by winding on a coil a compound mica sheet (this invention) including in a mica layer a chained, cured resin and an uncured epoxy resin composition containing a curing agent, and subjecting the resultant coil to vacuum/pressure impregnation and forming operation and (d) an insulated coil prepared by winding on a coil a compound mica sheet manufactured using a conventional liquid adhesive and subjecting the resultant coil to the same treatment as mentioned above. As is evident from this Figure the compound mica sheet according to this invention is excellent in its insulating property. The coil (d) insulated with the conventional compound mica sheet has its insulation broken down for 250 hours when an electric stress of 9 KV/mm is applied thereto. In contrast, the coil (c) insulated with the compound mica sheet according to this invention has its insulation destroyed after 1500 hours under the identical condition.

What we claim is:

1. A method of manufacturing an insulated electrical coil comprising the steps of:
   a. bonding a mica sheet to a lining material to produce a compound mica sheet by
      1. depositing a mixture of powdered epoxy resin and a curing agent onto the surface of a mica sheet to produce a coated mica sheet,
      2. contacting the lining material with the coated mica sheet, and
      3. subjecting the coated mica sheet and lining material together to a temperature and pressure sufficient to thermally fuse the powdered epoxy resin and bond the lining material to the mica sheet;
   b. mechanically winding said compound mica sheet into an electrical coil;
   c. impregnating the coil wound with the compound mica sheet with a thermosetting resin; and
   d. curing said impregnated coil.

2. A method of claim 1, wherein the mica sheet is a mica paper.

3. A method of claim 2, wherein the amount of the mixture of powdered resin and curing agent is from about 0.5 to about 8% by weight based on the weight of the mica.

4. A method of claim 1, wherein the mica sheet comprises flake mica.

5. A method of claim 4, wherein the amount of the mixture of powdered epoxy resin and curing agent is from about 0.5 to 6% by weight based on the weight of the mica.

6. A method of claim 1 wherein the temperature at which the powdered epoxy resin is thermally fused thereby bonding the lining material to the mica sheet is from about 100° C to about 150° C.

7. A method of claim 1, wherein the lining material is selected from the group consisting of paper, woven fabrics and plastic film.

8. A method of claim 1, wherein the particle size of the powdered epoxy resin is from about 50 to about 500 mesh.

9. A method of manufacturing an insulated electrical coil comprising the steps of
   a. impregnating a mica sheet with a thermosetting resin;
   b. curing the thermosetting resin impregnated therein to produce a cured mica sheet;
   c. bonding the cured mica sheet to a woven fabric to produce a compound mica sheet by
      1. depositing a mixture of a powdered epoxy resin and a curing agent onto the surface of the cured mica sheet to produce a coated cured mica sheet,
      2. contacting the woven fabric with the coated cured mica sheet, and
      3. subjecting the coated cured mica sheet and woven fabric together to a temperature and pressure sufficient to thermally fuse the powdered epoxy resin and bond the woven fabric to the cured mica sheet;
   d. mechanically winding said compound mica sheet onto an electric coil;
   e. impregnating the coil wound with the compound mica sheet with a thermosetting resin; and
   f. curing said impregnated coil.

10. A method of claim 9, wherein the amount of thermosetting resin impregnated into the mica paper is from about 0.1 to about 1% by weight based on the weight of the mica.

11. A method of claim 9, wherein the temperature at which the powdered epoxy resin is thermally fused thereby bonding the woven fabric to the cured mica sheet is from about 100° to about 150° C.

12. A method of claim 9, wherein the woven fabric is a glass cloth.

13. A method of claim 9, wherein the particle size of the powdered epoxy resin is from about 50 to about 500 mesh.

14. A method of manufacturing an insulated electrical coil comprising the steps of
   a. impregnating a mica sheet with a thermosetting resin;
   b. curing the thermosetting resin impregnated therein to produce a cured mica sheet;
   c. impregnating said cured mica sheet with an epoxy resin composition containing a curing agent to produce an impregnated cured mica sheet;
   d. bonding the impregnated cured mica sheet to a woven fabric to produce an integral compound mica sheet by
      1. depositing a mixture of a powdered epoxy resin and a curing agent onto the surface of the woven fabric to produce a coated woven fabric,
      2. contacting the coated woven fabric with the impregnated cured mica sheet, and
      3. subjecting the impregnated cured mica sheet and coated woven fabric together to a temperature and pressure sufficient to thermally fuse the powdered epoxy resin and bond the woven fabric to the impregnated cured mica sheet;
   e. mechanically winding said integral compound mica sheet onto an electric coil;
   f. impregnating the coil wound with the integral compound mica sheet with a thermosetting resin; and
   g. curing said impregnated coil.

15. A method of claim 14, wherein the mica sheet is a mica paper.

16. A method of claim 15, wherein the amount of the thermosetting resin of step (a) inpregnated into the mica paper is from about 0.1 to about 1% by weight based on the weight of the mica.

17. A method of claim 15, wherein the amount of epoxy resin composition of step (c) impregnated into the cured mica sheet is from about 5 to about 20% by weight based on the weight of the mica.

18. A method of claim 14, wherein the temperature at which the powdered epoxy resin is thermally fused thereby bonding the woven fabric to the impregnated cured mica sheet is from about 100° to about 150° C.

19. A method of claim 14, wherein the woven fabric is a glass cloth.

20. A method of claim 14, wherein the particle size of the powdered epoxy resin is from about 50 to about 500 mesh.

* * * * *

UNITED STATES PATENT AND TRADEMARK OFFICE
CERTIFICATE OF CORRECTION

PATENT NO. : 4,033,805
DATED : July 5, 1977
INVENTOR(S) : Hisayasu Mitsui et al

It is certified that error appears in the above—identified patent and that said Letters Patent are hereby corrected as shown below:

Column 6, line 65, "into" should be --onto--.

Column 7, line 4, after "powdered", insert --epoxy--.

Column 7, line 11, after "to" and before "6%", insert --about--.

Column 8, line 38, "inpregnated" should read --impregnated--.

Signed and Sealed this

Thirteenth Day of December 1977

[SEAL]

Attest:

RUTH C. MASON
Attesting Officer

LUTRELLE F. PARKER
Acting Commissioner of Patents and Trademarks